Patented Nov. 15, 1932

1,887,500

UNITED STATES PATENT OFFICE

DONALD K. CRAMPTON, OF MARION, AND HENRY L. BURGHOFF, OF YALESVILLE, CONNECTICUT, ASSIGNORS TO THE CHASE COMPANIES, INCORPORATED, OF WATERBURY, CONNECTICUT, A CORPORATION

WELDING-ROD, ETC.

No Drawing.    Application filed April 26, 1932.    Serial No. 607,666.

This invention relates to an improvement in welding-elements, that is to say, rods, wires, bars, etc., for use in brazing or welding operations, and relates in particular to welding-elements composed of alloys containing a preponderance of copper and zinc, which therefore may be properly termed "brass alloys," though such alloys are sometimes commercially designated as "bronzes."

Brass as a welding medium, while possessing many desirable attributes, is open to the objection that during the welding operation, the zinc content is caused to boil and fume to the discomfort of the welder and some degree of hindrance in securing a proper bond.

The main object of our present invention is to provide a welding-element having the desirable features of a brass composition, and at the same time possessing superior welding properties both as to the ultimate bond produced and the facility and convenience of its use.

We have discovered that by combining beryllium with brass, having a copper content from about 50% to 65%, the fumes ordinarily evolved in the welding process may be greatly reduced or entirely eliminated, depending upon the amount of beryllium contained in the alloy. Furthermore, we have ascertained that the amount of beryllium required to produce a sufficient suppression of the zinc fumes need be so relatively small as to have little or no effect upon the ordinary physical properties of the welding alloy.

As an illustration of our discovery, we find that by the addition of .002% to .02% of beryllium to brass containing about 60% copper, .75% tin and the balance mainly zinc plus some very minor amount of other elements, such as manganese, nickel, iron, etc., the resultant alloy is admirably suited for welding, being characterized by good flowing and bonding properties and an almost negligible evolution of zinc fumes during the welding process. By increasing the beryllium content above .05% to and including .2% it was found that the fuming could be entirely eliminated, though somewhat to the detriment of the flowing properties of the alloy during the welding or brazing operation.

Although reference is made herein to certain specific alloys, it is to be understood that our invention is not limited to the proportion recited. In general, our improved alloy is characterized by a preponderance of copper and zinc and from .002% to .2% beryllium, together, if desired, with relatively-small amounts of such other elements as may be desired to improve strength, ductility, corrosion resistance, color, etc., of the alloy.

The following alloys are illustrative of various combinations of materials in accordance with our invention:

|  | A | B | C | D |
|---|---|---|---|---|
| Copper % | 59.00 | 60.00 | 58.00 | 59.00 |
| Beryllium % | 0.02 | 0.015 | 0.03 | 0.02 |
| Zinc % | 40.88 | 39.135 | 39.95 | 37.83 |
| Tin % |  | 0.75 | 0.90 | 1.00 |
| Manganese % |  |  | 0.05 | 0.10 |
| Iron % |  |  | 1.00 | 1.00 |
| Nickel % |  |  |  | 1.00 |
| Miscellaneous % | 0.10 | 0.10 | 0.07 | 0.05 |

The reduction in the evolution of zinc oxide fumes from these beryllium-bearing brasses is probably due to the formation of a protective film of beryllium oxide upon the surface of the molten metal. It is to be understood, of course, that a suitable flux should be used in conjunction with our improved welding-element during the welding process.

In preparing our improved brass-welding alloy, we prefer to first prepare an alloy containing about 12.5% beryllium and the balance mainly copper, and then subsequently combining this beryllium-copper alloy with brass in such proportions as to produce a brass alloy having the desired beryllium content. While the mode of manufacture described is preferable, it is not in any sense necessary in the manufacture of our improved alloy, since the beryllium may be combined with the copper and zinc by any of the well-known methods of producing alloys.

We claim:

1. A welding-rod or the like composed of an alloy including copper, zinc, and a fume-suppressing element in the form of beryllium; the sum of the copper and zinc contents being at least 80%, and the beryllium being present in an amount between .002% and .2% inclusive.

2. A welding-rod or the like composed of an alloy including copper, zinc and a fume-suppressing element in the form of beryllium; the sum of the copper and zinc contents being at least 80%, and the beryllium being present in an amount in excess of .002% but not over .05%.

3. A welding-rod or the like composed of an alloy including copper 50% to 65%, a fume-suppressing element in the form of beryllium .002% to .2% and a balance consisting predominately of zinc.

4. A welding-rod or the like composed of an alloy including copper 50% to 65%, a fume-suppressing element in the form of beryllium in an amount in excess of .002% but not over .05%, and a balance consisting predominately of zinc.

5. A welding-rod or the like composed of an alloy including copper 50% to 65%, tin .2% to 1.5%, a fume-suppressing element in the form of beryllium .002% to .05%, and zinc in an amount predominating the balance.

6. A welding-rod or the like composed mainly of brass, and including a fume-suppressing element in the form of beryllium in an amount between .002% and .2% inclusive.

7. A welding-rod or the like composed mainly of brass and including a fume-suppressing agent in the form of beryllium in an amount not less than .002% and not in excess of .06% inclusive.

In testimony whereof, we have signed this specification.

DONALD K. CRAMPTON.
HENRY L. BURGHOFF.